No. 887,675. PATENTED MAY 12, 1908.
H. L. MAINLAND.
ANIMAL TRAP.
APPLICATION FILED SEPT. 7, 1907.
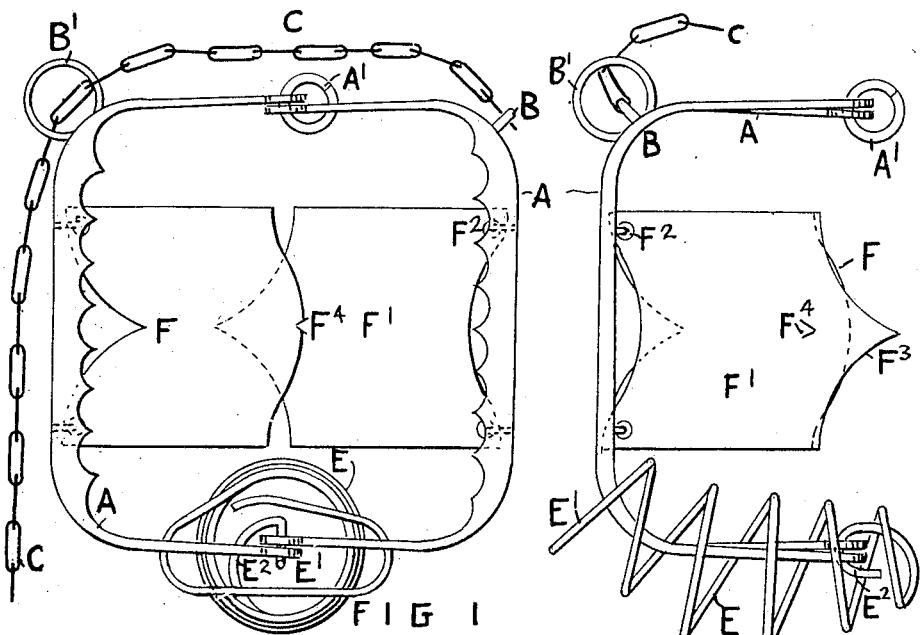
FIG 1
FIG 2
FIG 3
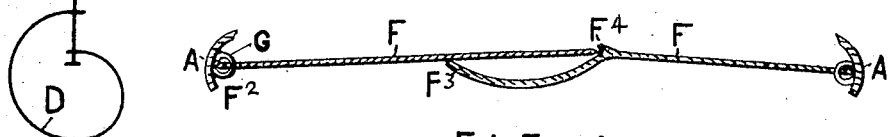
FIG 4
Witnesses:
Inventor
Hugh L. Mainland
By
James L. Norris
Atty

UNITED STATES PATENT OFFICE.

HUGH LAING MAINLAND, OF BURKES, NEAR DUNEDIN, NEW ZEALAND.

ANIMAL-TRAP.

No. 887,675.

Specification of Letters Patent.

Patented May 12, 1908.

Application filed September 7, 1907. Serial No. 391,790.

*To all whom it may concern:*

Be it known that I, HUGH LAING MAINLAND, a subject of the King of Great Britain, and resident of Burkes, near the city of Dunedin, in the British Colony of New Zealand, have invented certain new and useful Improvements in Animal-Traps, of which the following is a specification.

This invention relates to "animal traps," and has for its object to provide a trap of such class in a manner as hereinafter set forth with means imparting to the trap a great holding power, but without undue maiming of the animal caught.

Further objects of the invention are to provide an animal trap which shall be very light and compact, strong, durable, efficient in its use, conveniently set and inexpensive to manufacture.

With the foregoing and other objects in view, the invention consists in the novel construction, combination and arrangement of parts hereinafter more specifically described and illustrated in the accompanying drawings wherein is shown the preferred embodiment of the invention, but it is to be understood that changes, variations and modifications can be resorted to which come within the scope of the claims hereunto appended.

In the accompanying drawings, wherein like reference characters denote corresponding parts throughout the several views, Figure 1 is a plan of a trap in accordance with this invention, with the parts set; Fig. 2 is a side elevation; Fig. 3 is a front elevation with the parts sprung, and, Fig. 4 is a transverse section.

Referring to the drawings in detail, A denotes the jaws which are yoke-shaped with the intermediate portions thereof serrated or toothed. One arm of one of the jaws is hinged to the opposing arm of the other of the jaws through the medium of a ring A' which extends through the ends of said arms. The other arms of the jaws are hinged together through the medium of the looped end $E^2$ of the trap spring, said looped end $E^2$ extending through the ends of the said arms. The shape of one of the jaws A with respect to the shape of the other jaw is such that when the trap is sprung the intermediate or what may be termed the upper portions of the jaws abut. Provision for the abutting of the said intermediate or upper portions of the jaws is had by arranging the serrations or teeth of one jaw alternately with respect to the serrations or teeth of the other jaw.

The trap spring E is somewhat similar to what may be termed a barrel spring, the intermediate coils of the spring being larger than the end coils with the exception of the outer portion E' of the spring E. This outer portion is bent in what may be termed a substantially oval-shaped manner and projects laterally from each side of the other coils of the spring. The outer side of the portion E' is bent inward towards the jaws as shown. This bend tilts up the said portion E', imparting to it a tendency to wedge or to press the jaws further from their center, thereby increasing the power of the spring. The portion E' also provides a grip for the fingers when setting the trap.

The trap spring E is so positioned that when the jaws are set the arms at one side of the jaws will bear upon the top of the spring in a manner as clearly shown in Fig. 1; the ends of said arms being positioned approximately centrally of the spring E. When the trap is sprung the coils of the springs move up the said side arms which have been bearing against the spring as shown in Fig. 3—that is to say when the spring is released and expands, it forces the jaws towards each other and the coils of the spring surround those side arms of the jaws which were bearing against the spring and the latter maintains the jaws in closing position until the spring is pressed and retained in a compressed position in a manner as hereinafter set forth.

To maintain the spring compressed, as well as the jaws extended; or in other words the trap in its set position, a pair of setting plates is provided and which are indicated by the reference characters F—F'. These plates also constitute a swinging platform for the animal to tread upon. The plates at one end are hinged to the jaws through the medium of the loops G which extend through openings $F^2$ in the plates, as clearly shown in Fig. 4. The loops G are connected to the intermediate or upper portions of the jaws and depend from the lower faces thereof. The plate F at its free end is formed with a knife edge which is adapted to engage under an overhanging, substantially V-shaped protuberance $F^4$ extending from the upper face of the plate F' at a point removed from the free edge thereof. That portion of the plate F' which extends from the protuberance F⁴ is bent in a curvilinear manner and is positioned below the plate F when the knife edge of the plate F engages under the protuberance F⁴. That portion of the plate F' which extends below the plate F is cut away so as to form the projecting end in what may be termed a V-shaped manner, thereby preventing the dirt from accumulating to any great extent between the overlapping portions of the plate. When the knife edge of the plate F engages under the protuberance F⁴, as clearly shown in Fig. 1, the trap is set. The size of the protuberance F⁴ is such that it will allow of the trap being sprung with a small amount of weight.

The jaw F' has projecting from the top thereof at one side an eye B to which is attached one end of a tether, cord or chain C (as shown a chain). The latter extends through an eye B' projecting from the jaw F and has its free end provided with a tug spring ring D the said ring D being swivelly connected to the chain C.

It will be assumed that the trap is set as shown in Fig. 1. The animal treads upon either of the plates F or F', the plate F will be released from the projection F⁴, which allows the spring E to come into play and force the jaws upwardly and grip the animal, the jaws being maintained in such position through the medium of the coils of the spring which surrounds the arms of the jaws at one side in a manner as shown in Fig. 3. The manner of setting up the chain—that is to say, securing it to one jaw and loosely extending through a ring on the opposite jaw and having the other end of the chain secured to a tethering peg through the medium of the swiveling spring ring, will evidently ease the tugging which otherwise tends to draw the peg, or unduly injure the animal at the part caught.

What I claim is—

1. An animal trap comprising a pair of hinged jaws, and a trap spring having coiled different diameters thereby facilitating the compact compressing of the spring, said spring adapted to act upon said jaws thereby moving them together, the outer coil of said spring being substantially oval in contour and projecting laterally from each side of the other coils, said spring further having the outer side of the outer coil bent inwardly towards the jaws.

2. An animal trap comprising a trap spring formed of coils of different diameters, thereby enabling the compact compressing of the spring, said spring having the outer coil thereof projecting laterally from each side of the other coils and said outer coil having the outer side thereof bent inwardly towards the trap.

3. An animal trap comprising a pair of spring jaws, and setting plates hinged to and suspended from the lower faces of the intermediate or upper portions of said jaws, one of said plates provided with an overhanging protuberance and the other of said plates with a knife edge, said knife edge adapted to engage under said protuberance thereby maintaining the trap in its set position.

4. An animal trap comprising a pair of spring jaws, setting plates hinged to and suspended from the lower faces of the intermediate or upper portions of said jaws, one of said plates provided with an overhanging protuberance and the other of said plates with a knife edge, said knife edge adapted to engage under said protuberance thereby maintaining the trap in its set position, and a spring connected to the jaws and held under a state of tension when said plates engage with each other, said spring adapted to move the jaws to closing position when the plates are disengaged.

5. An animal trap comprising a pair of setting plates, one of said plates provided with a protuberance, the other of said plates formed with a knife edge, said knife edge adapted to engage under said protuberance to maintain the trap set, that plate which is provided with a protuberance adapted to extend under the other plate, said extending portion cut away and formed in a curvilinear manner.

6. An animal trap embodying a pair of spring actuated jaws, each of said jaws provided with an eye, a chain connected at one end to one of said eyes and loosely extending through the other of said eyes, and a tug spring ring swivelly connected to the other end of said chain and adapted to be attached to a support.

7. An animal trap embodying a pair of jaws, means for hinging the jaws together at one side, a trap spring adapted when expanded to move the jaws to closing position, said trap spring hinging the other side of the jaws together, and a pair of plates hinged to the jaws, one of said plates provided with a protuberance adapted to be engaged by the other of said plates thereby maintaining the jaws in an open position, said spring under tension and the trap in a set position, said plates constituting a swinging platform and released upon the application of pressure.

In testimony whereof I have hereunto set my hand.

HUGH LAING MAINLAND.

In the presence of—
HENTON MACAULAY DAVEY,
ELIZABETH ANN DAVEY.